US012722866B1

(12) United States Patent
Karanxha

(10) Patent No.: US 12,722,866 B1
(45) Date of Patent: Sep. 1, 2026

(54) PAINT STORAGE BOX FOR ARTIST PALETTE

(71) Applicant: Nensi Karanxha, Milton, MA (US)

(72) Inventor: Nensi Karanxha, Milton, MA (US)

( * ) Notice: Subject to any disclaimer, the term of this patent is extended or adjusted under 35 U.S.C. 154(b) by 0 days.

(21) Appl. No.: 19/240,481

(22) Filed: Jun. 17, 2025

(51) Int. Cl.

| | |
|---|---|
| ***B65D 81/22*** | (2006.01) |
| ***B44D 3/12*** | (2006.01) |
| ***B65D 25/04*** | (2006.01) |
| ***B65D 43/02*** | (2006.01) |
| *B44D 3/02* | (2006.01) |

(52) U.S. Cl.
CPC ............ *B65D 81/22* (2013.01); *B44D 3/122* (2013.01); *B65D 25/04* (2013.01); *B65D 43/0202* (2013.01); *B44D 3/02* (2013.01); *B65D 2543/00212* (2013.01)

(58) Field of Classification Search
CPC .......... B65D 25/04; B65D 2543/00194; B65D 81/22; B65D 1/24; B65D 43/0202; B65D 2543/00212; B44D 3/122; B44D 3/02
See application file for complete search history.

(56) References Cited

U.S. PATENT DOCUMENTS

| | | | | |
|---|---|---|---|---|
| 1,901,861 A * | 3/1933 | Baker | B44D 3/04 | 312/231 |
| 2,940,200 A * | 6/1960 | Endlich | B44D 3/04 | 206/229 |
| 3,273,700 A * | 9/1966 | Moreau | B44D 3/04 | 220/23.88 |
| 4,303,158 A * | 12/1981 | Perkins | A45C 11/24 | 312/902 |
| 5,103,969 A * | 4/1992 | Tarozzi | B44D 3/02 | 229/117.22 |
| 5,325,958 A * | 7/1994 | Arasim | B44D 3/04 | 206/1.7 |
| 2021/0060999 A1* | 3/2021 | Chang | B44D 3/04 | |
| 2025/0333228 A1* | 10/2025 | Darst | A61J 1/03 | |

* cited by examiner

*Primary Examiner* — Shawn M Braden
(74) *Attorney, Agent, or Firm* — Lando & Anastasi, LLP

(57) ABSTRACT

The paint storage container is a portable paint container designed to preserve individual daubs of paint for extended use. The container consists of a base (1) with multiple compartments (10) for holding paint, and a cover (2) that slides into side slots (4) to enclose the container. Each compartment (10) is shorter than the full height of the base (1), leaving an upper air space (9) that allows preservative vapor such as clove oil or water to circulate. The L-shaped cover (2) slides into the base's side slots (4) and seals the container on the top and front faces. When closed, the container prevents paint drying; when the cover (2) is removed, the open front side allows artists direct access to the paint.

2 Claims, 2 Drawing Sheets

PAINT STORAGE BOX FOR ARTIST PALETTE

BACKGROUND

The present disclosure relates generally to a paint storage box for artist palettes.

SUMMARY

One aspect of the present disclosure is directed to a paint storage container. In one embodiment, the paint storage container comprises a base having a bottom, a pair of sidewalls, a rear wall, and an open front side; a plurality of paint-holding compartments disposed within the base, each compartment having a height less than that of the base, thereby defining an upper air space above the compartments; a cover formed as an elongated L-shaped structure configured to slide laterally into opposing slots in the sidewalls of the base, said cover enclosing the top and the open front side of the base when fully inserted, thereby forming a substantially sealed container; wherein the open front side of the base permits direct access to the compartments when the cover is removed or retracted, and wherein the upper air space allows vapor from a preservative substance to circulate within the sealed container above the compartments to preserve paint stored therein.

Embodiments of the paint storage container may further include a felt strip affixed to an interior surface of the cover, the felt strip configured to absorb and gradually release a preservative vapor, including clove oil or water, to aid in the preservation of various paint mediums such as oil paint, water-based oil paint, gouache, watercolor, or acrylic.

DETAILED DESCRIPTION

Figure 1:
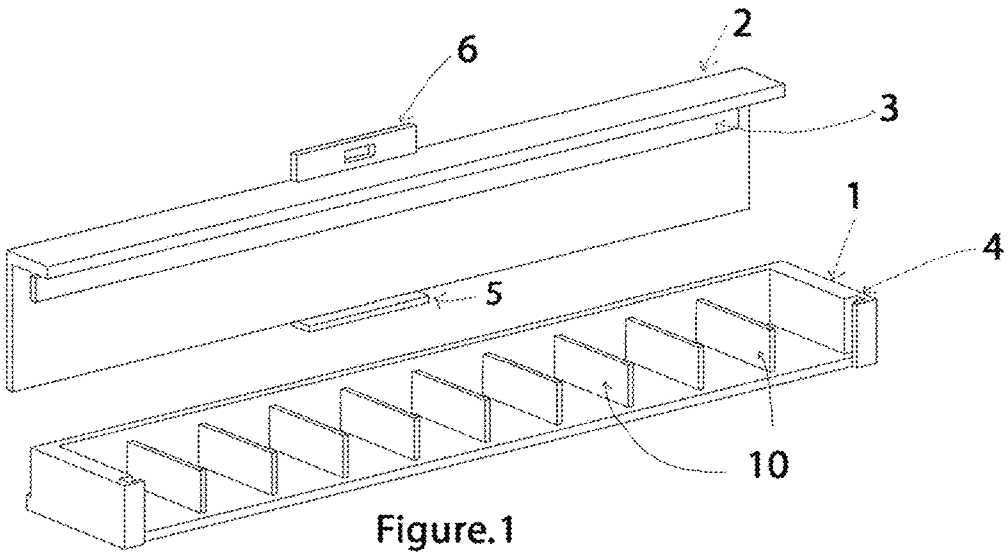
FIG. 1 is an exploded perspective view of a paint storage container.
Figure 2:
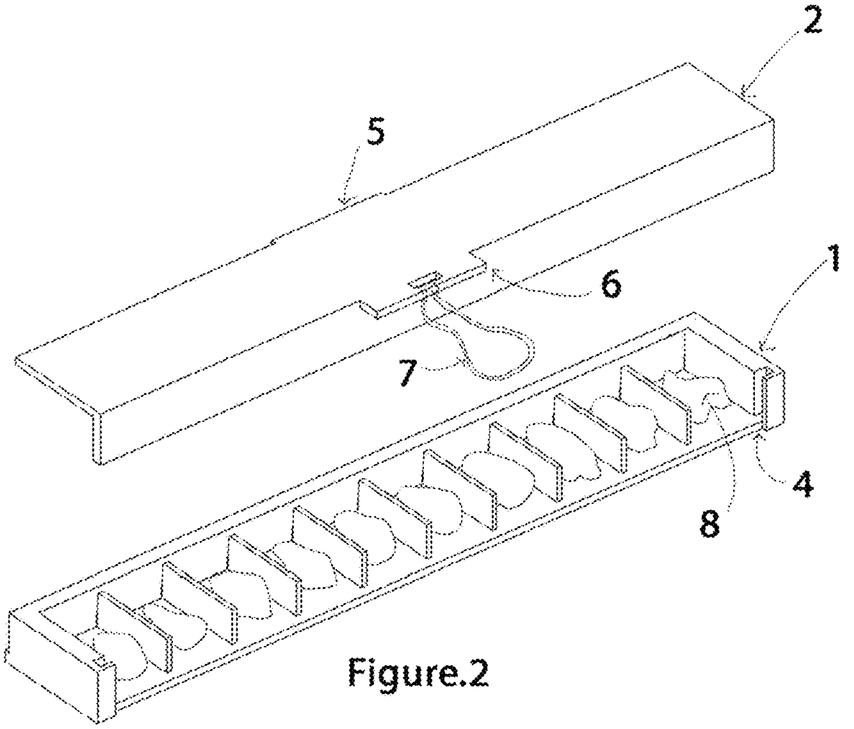
FIG. 2 is an exploded perspective view of a paint storage container.
Figure 3:
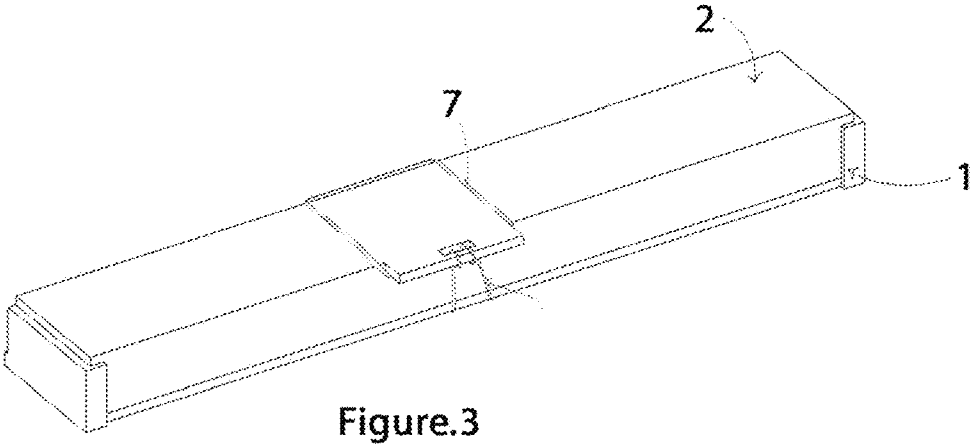
FIG. 3 is a front perspective view of a paint storage container.
Figure 4:
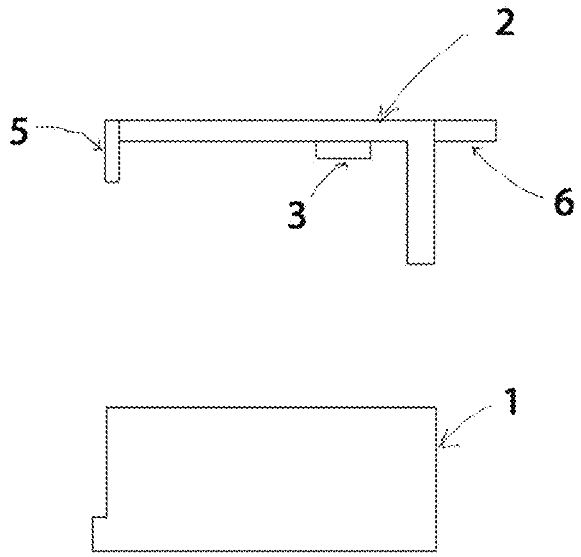
FIG. 4 is an exploded side elevational view of a paint storage container.
Figure 5:
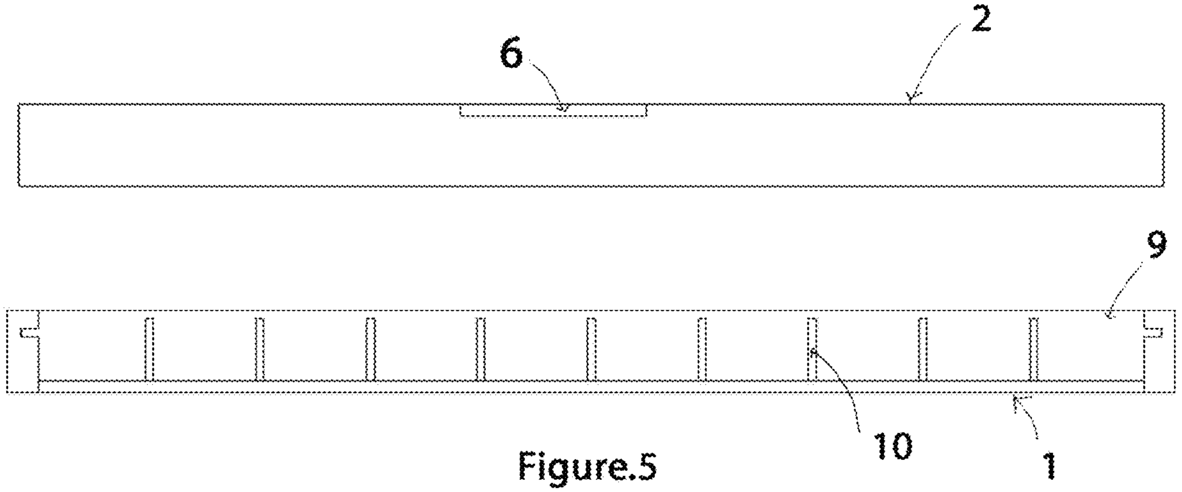
FIG. 5 is an exploded side elevational view of a paint storage container.
Figure 6:
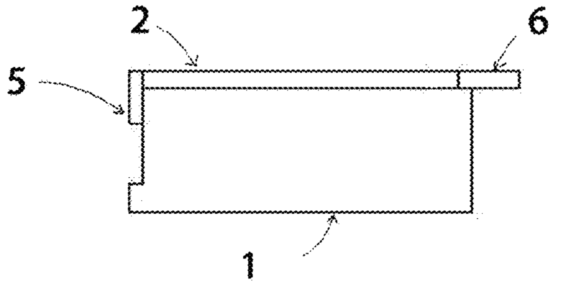
FIG. 6 is a side elevational view of a paint storage container.

The paint storage container comprises a base (1), an L-shaped cover (2), and optionally a preservative vapor delivery system. The base (1) includes a bottom panel, two sidewalls, a rear wall, and an open front side. Within the base (1) are multiple compartments (10) arranged in a row. Each compartment (10) is dimensioned to hold a discrete daub of paint (8) and has a height less than the overall height of the base (1). This structural design leaves an upper air space (9) above the compartments (10) for the purpose of vapor flow. The cover (2) is an L-shaped extrusion, sliding laterally into slots (4) located in the opposing sidewalls of the base (1). When fully inserted, the cover (2) encloses the top and open front side of the base (1) to form a sealed volume. A felt strip (3) can be mounted inside the top inner surface of the cover (2) to carry a small quantity of clove oil, water, or other volatile substances. This setup allows the vapor to disperse uniformly across the upper air space (9), slowing oxidation and preserving paint quality. A bracket (5) on one end of the cover (2) functions as a closure guide, while another bracket (6) may act as a handle. An elastic band (7) may optionally secure the cover (2) in place during transport. The design facilitates studio or plein air painting, allowing access to the paint from the open front side during use and sealed preservation afterward.

REFERENCE NUMERALS (1) Base
(2) Cover
(3) Felt strip
(4) Side slots
(5) Bracket
(6) Handle
(7) Elastic band
(8) Paint daub
(9) Air space
(10) Compartments

What is claimed is:

1. A paint storage container comprising: a base (1) having a bottom, a pair of sidewalls, a rear wall, and an open front side; a plurality of paint-holding compartments (10) disposed within the base (1), each compartment (10) having a height less than that of the base (1), thereby defining an upper air space (9) above the compartments (10); a cover (2) formed as an elongated L-shaped structure configured to slide laterally into opposing slots (4) in the sidewalls of the base (1), said cover (2) enclosing the top and the open front side of the base (1) when fully inserted, thereby forming a substantially sealed container; wherein the open front side of the base (1) permits direct access to the compartments (10) when the cover (2) is removed or retracted, and wherein the upper air space (9) allows vapor from a preservative substance to circulate within the sealed container above the compartments (10) to preserve paint (8) stored therein.

2. The container of claim 1, further comprising a felt strip (3) affixed to an interior surface of the cover (2), the felt strip (3) configured to absorb and gradually release a preservative vapor, including clove oil or water, to aid in the preservation of various paint mediums including oil paint, water-based oil paint, gouache, watercolor, or acrylic.

* * * * *